US007546118B2

(12) United States Patent
Camp, Jr.

(10) Patent No.: US 7,546,118 B2
(45) Date of Patent: Jun. 9, 2009

(54) COORDINATED DISTRIBUTION AND PLAYBACK OF MULTIMEDIA PROGRAMS

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 779 days.

(21) Appl. No.: 11/254,847

(22) Filed: Oct. 20, 2005

(65) Prior Publication Data

US 2007/0093239 A1   Apr. 26, 2007

(51) Int. Cl.
*H04M 3/00* (2006.01)
(52) U.S. Cl. ..................... 455/418; 455/420
(58) Field of Classification Search ............... None
See application file for complete search history.

(56) References Cited

U.S. PATENT DOCUMENTS

| | | | | |
|---|---|---|---|---|
| 5,661,665 | A * | 8/1997 | Glass et al. | 348/423.1 |
| 6,021,181 | A * | 2/2000 | Miner et al. | 379/88.23 |
| 6,725,215 | B2 * | 4/2004 | Yamamoto | 707/3 |
| 2002/0095613 | A1 | 7/2002 | Matsuoka et al. | |
| 2004/0072584 | A1 * | 4/2004 | Kern | 455/466 |
| 2004/0199654 | A1 | 10/2004 | Juszkiewicz | |
| 2005/0125733 | A1 | 6/2005 | Aleksic | |
| 2007/0189737 | A1 * | 8/2007 | Chaudhri et al. | 386/125 |
| 2008/0076469 | A1 * | 3/2008 | Shin et al. | 455/556.1 |
| 2008/0261513 | A1 * | 10/2008 | Shin et al. | 455/3.06 |

FOREIGN PATENT DOCUMENTS

EP   1225717   7/2002

OTHER PUBLICATIONS

International Search Report and Written Opinion for International Application No. PCT/US2006/023836, Mailed Nov. 7, 2006.
*IMS—IP Multimedia Subsystem: The value of using the IMS architecture*, Ericsson White Paper, Oct. 2004.
Wikipedia, the free encyclopedia, *Session Initiation Protocol (SIP)*, http://en.wikipedia.org/wiki/Session_Initiation_Protocol, accessed Sep. 27, 2005.
Wikipedia, the free encyclopedia, *Short message service (SMS)*, http://en.wikipedia.org/wiki/Short_message_service, accessed Sep. 22, 2005.
Wikipedia, the free encyclopedia, *Multimedia Messaging System (MMS)*, http://en.wikipedia.org/wiki/Multimedia_Messaging_System, accessed Sep. 22, 2005.

* cited by examiner

*Primary Examiner*—Ajit Patel
(74) *Attorney, Agent, or Firm*—Myers Bigel Sibley & Sajovec

(57) ABSTRACT

Methods of coordinating playback of a multimedia program by a plurality of subscriber mobile terminals include providing a multimedia program to the plurality of subscriber mobile terminals, and providing a command to the plurality of subscriber mobile terminals, after providing the multimedia program, to control the playback of the provided program by the plurality of subscriber mobile terminals. The program may be encrypted, and some methods may include transmitting an encryption key to the plurality of subscriber mobile terminals. A communication system includes a subscriber mobile terminal configured to play a multimedia program, an originating terminal configured to provide the multimedia program to subscriber mobile terminal and to provide a playback command to the plurality of subscriber mobile terminals to control the playback of the provided program by the subscriber mobile terminal. Computer program products are also disclosed.

28 Claims, 6 Drawing Sheets

COORDINATED DISTRIBUTION AND PLAYBACK OF MULTIMEDIA PROGRAMS

FIELD OF THE INVENTION

The present invention relates to communications methods and systems, and more particularly, to communications methods and systems configured for a distributed multipoint network.

BACKGROUND

Digital multimedia programs may be distributed over data communication networks, such as the internet. Such data communication networks may include wireless communication networks, such as cellular and/or PCS networks. In particular, as the bandwidth of wireless communication networks increases and subscriber terminals become more and more sophisticated, the distribution of digital multimedia programs over wireless communication networks may increase. As used herein, the term "multimedia" programs may include, for example, audio, image and/or video programs.

One way to distribute multimedia programs is to permit a recipient to download the programs over a network connection, such as a point-to-point network connection, to a user terminal. The recipient may save the program and/or play the program as it is being downloaded. If the program is saved, the user may play the program at a later time. Thus, for example, a user may download a multimedia program in a background (i.e. non-realtime) process and play the program at a later time once it has finished downloading.

One popular form of distributing multimedia content over the internet is known as "podcasting," which allows users to receive a feed of multimedia programs from one or more program providers. Podcasting typically refers to a subscription-based program delivery model that uses a feed to deliver a multimedia program to a subscriber. Podcast subscriptions may be free and/or maybe fee-based. Users may subscribe to podcast feeds using "aggregator" software, which may periodically check for and download new program automatically. The aggregator software may reside on a mobile device and/or may enable a user to copy downloaded programs to a mobile device.

Point-to-point communication of multimedia signals, such as via conventional podcasting, may require an excessive amount of network resources. Such problems may be particularly apparent on a wireless network, and, more particularly, if the program is large in size and/or is intended for a large audience. Point-to-multipoint transmission (i.e. multicasting) of video programs may be an efficient use of the limited bandwidth available to wireless networks. Thus, various protocols for multicasting and broadcasting of video data over wireless networks have been proposed. For example, MBMS (Mobile Broadcast/Multicast Service) and DVB-H (Digital Video Broadcast—Handheld) protocols have been proposed. DVB-H, in particular, is an extension of a digital video broadcast protocol that has been implemented on wired networks in Europe.

While multicasting may enable a large number of users to receive a single program, such a transmission system may not be suitable for all purposes. For example, if a subscriber's terminal is switched off during the multicast, the subscriber may miss the program altogether.

Wireless communication between electronic devices may be accomplished using a wide variety of communication media, communication systems and communication standards. For example, portable electronic devices such as mobile telephones are typically configured to communicate via analog and/or digital wireless radio frequency (RF) telephone systems. Such devices may additionally be configured to communicate using wired and/or wireless local area networks (LANs), short range communication channels such as Bluetooth RF communication channels and/or infrared communication channels, and/or long range communication systems such as satellite communication systems.

Mobile terminals are, typically, purchased by a user for the purpose of obtaining access to wireless telephone services through a cellular telephone network. However, as the processing capabilities, memory and the like included in such mobile terminals increases, an additional level of user functionality is being included in the hardware and/or software of such mobile terminals. For example, a mobile terminal may be provided with a still and/or video camera, allowing pictures and/or videos to be taken by a user and transmitted from the mobile terminal to others. Likewise, many mobile terminals include a personal digital assistant (PDA) type application suitable for tracking scheduling, tasks and the like for the user. Many mobile terminals also include messaging capability, such as electronic mail (e-mail), short message service (SMS) and multimedia message service (MMS) capabilities. Mobile terminals may also be capable of connecting to the internet by using internet protocol (IP) communications over wireless and/or wired networks. Thus, as mobile terminals may include sophisticated multimedia display capabilities as well as being able to communicate using multiple protocols and/or communication media, mobile terminals may be ideal platforms for receiving some types of multimedia programs. However, conventional multimedia distribution systems, such as those described above, have not taken full advantage of the capabilities of such devices.

SUMMARY

Methods of coordinating playback of a multimedia program by a plurality of subscriber mobile terminals according to some embodiments of the invention include providing a multimedia program to the plurality of subscriber mobile terminals, and providing a playback command to the plurality of subscriber mobile terminals, after providing the multimedia program, to control the playback of the provided program by the plurality of subscriber mobile terminals.

Methods according to some embodiments of the invention may further include receiving the multimedia program at least one of the subscriber mobile terminals, receiving the playback command at the at least one of the plurality of subscriber mobile terminals and initiating playback of the multimedia program at the at least one of the plurality of subscriber mobile terminals. Receiving the playback command may include receiving the playback command via an IMS and/or SMS messaging service.

Methods according to further embodiments of the invention may include receiving a second playback command during playback of the multimedia program, and controlling the playback of the multimedia program responsive to the second playback command.

Methods according to some embodiments of the invention may further include receiving a voice signal during playback of the multimedia program, and playing the voice signal concurrently with playback of the multimedia program. The voice signal may be received via a protocol including MMS and/or VoIP.

Methods according to some embodiments of the invention may further include receiving a voice signal during playback of the multimedia program, interrupting the playback of the multimedia program responsive to receiving the voice signal, and playing the voice signal while the playback of the multimedia program may be interrupted.

Methods according to some embodiments of the invention may further include transmitting a playback command from one of the plurality of subscriber mobile terminals to other of the subscriber mobile terminals during playback of the multimedia program by the other subscriber mobile terminals.

Methods according to some embodiments of the invention may further include transmitting a playback command request from one of the subscriber mobile terminals to a control terminal, and transmitting a playback command from the control terminal to selected ones of the plurality of subscriber mobile terminals responsive to the playback command request. The playback command may include a start, a stop, a rewind, and/or a skip command.

Methods according to some embodiments of the invention may further include transmitting configuration data to one of the subscriber wireless terminals, the configuration data including control permissions for the one of the subscriber wireless terminals. The control permissions specify the permissions of the one of the subscriber wireless terminals to control playback of the multimedia program by the one of the plurality of subscriber wireless terminals.

Providing the multimedia program to the plurality of subscriber mobile terminals may include transmitting the multimedia program over a first network, and providing the command to the plurality of subscriber mobile terminals may include transmitting the command over a second network, different from the first network.

The first network may include a public communication network and the second network may include a private communication network. Alternatively, the first network may include a private communication network and the second network may include a public communication network. In particular, the first network may include the internet and the second network may include a cellular communication network. The first network and the second network may be the same network.

Methods according to some embodiments of the invention may further include receiving the multimedia program at a subscriber mobile terminal, and transmitting a notification from the subscriber mobile terminal in response to receiving the multimedia program.

Methods according to some embodiments of the invention transmitting the multimedia program to the plurality of subscriber mobile terminals may include transmitting a confirmation address together with the multimedia program, and transmitting a notification from the one of the subscriber mobile terminals in response to receiving the multimedia program may include transmitting the notification addressed to the confirmation address.

The multimedia program may include an encrypted data file, and transmitting the command to the plurality of subscriber mobile terminals may include transmitting a file decryption key configured to decrypt the encrypted data file to the plurality of subscriber mobile terminals.

Methods according to some embodiments of the invention may further include receiving the command including the file decryption key at the one of the subscriber mobile terminals, decrypting the encrypted data file, and initiating playback of the multimedia program.

Providing the multimedia program to the plurality of subscriber mobile terminals may include transmitting the multimedia program using a first transmission protocol, and transmitting the command to the plurality of subscriber mobile terminals may include transmitting the command using a second transmission protocol, different from the first transmission protocol. The first transmission protocol may include HTTP, FTP, SIP, and/or MMS, and the second transmission protocol may include SMS and/or SMTP.

A communication system according to some embodiments of the invention includes a plurality of subscriber mobile terminals configured to play a multimedia program, an originating terminal configured to provide the multimedia program to the plurality of subscriber mobile terminals and to provide a playback command to the plurality of subscriber mobile terminals, after providing the multimedia program, to control the playback of the provided program by the plurality of subscriber mobile terminals, thereby coordinating playback of the multimedia program by the plurality of subscriber mobile terminals.

At least one of the plurality of subscriber mobile terminals may be configured to receive the multimedia program, to receive the playback command from the originating terminal, and to control playback of the multimedia program responsive to the playback command received from the originating terminal.

At least one of the plurality of subscriber mobile terminals may be further configured to transmit a playback command to others of the plurality of subscriber mobile terminals during playback of the multimedia program by the others of the plurality of subscriber mobile terminals.

At least one of the plurality of subscriber mobile terminals may be configured to transmit a playback command request to the originating terminal, and the originating terminal may be further configured to transmit a playback command to selected ones of the plurality of subscriber mobile terminals responsive to the playback command request.

A computer program product for coordinating playback of a multimedia program provided to a plurality of subscriber mobile terminals according to some embodiments of the invention includes a computer readable storage medium having computer readable program code embodied in said medium. The computer readable program code includes computer readable program code configured to receive the multimedia program at one of the plurality of subscriber mobile terminals, computer readable program code configured to receive a playback command at the one of the subscriber mobile terminals, and computer readable program code configured to control playback of the multimedia program at the one of the plurality of subscriber mobile terminals in response to the playback command.

The computer readable program code may further include computer readable program code configured to receive a voice signal during playback of the multimedia program, and computer readable program code configured to play the voice signal concurrently with playback of the multimedia program.

The computer readable program code may further include computer readable program code configured to receive a voice signal during playback of the multimedia program, computer readable program code configured to interrupt the playback of the multimedia program responsive to receiving the voice signal, and computer readable program code configured to play the voice signal while the playback of the multimedia program may be interrupted.

The computer readable program code may further include computer readable program code configured to transmit a playback command to other of the plurality of subscriber mobile terminals during playback of the multimedia program by the other of the plurality of subscriber mobile terminals.

A communication terminal according to some embodiments of the invention includes a processor, and a display coupled to the processor and configured to play a multimedia program. The processor is configured to receive the multimedia program, to receive a playback command, and to initiate playback of the multimedia program in response to the command.

The processor may be further configured to receive a second playback command during playback of the multimedia program and to control the playback of the multimedia program responsive to the second playback command.

The processor may be further configured to receive a voice signal during playback of the multimedia program and to play the voice signal concurrently with playback of the multimedia program.

The processor may be further configured to receive a voice signal during playback of the multimedia program and to interrupt the playback of the multimedia program responsive to receiving the voice signal, and the processor may be further configured to play the voice signal while the playback of the multimedia program may be interrupted.

The processor may be further configured to transmit a playback command to other communication terminals during playback of the multimedia program.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

Figure 1:
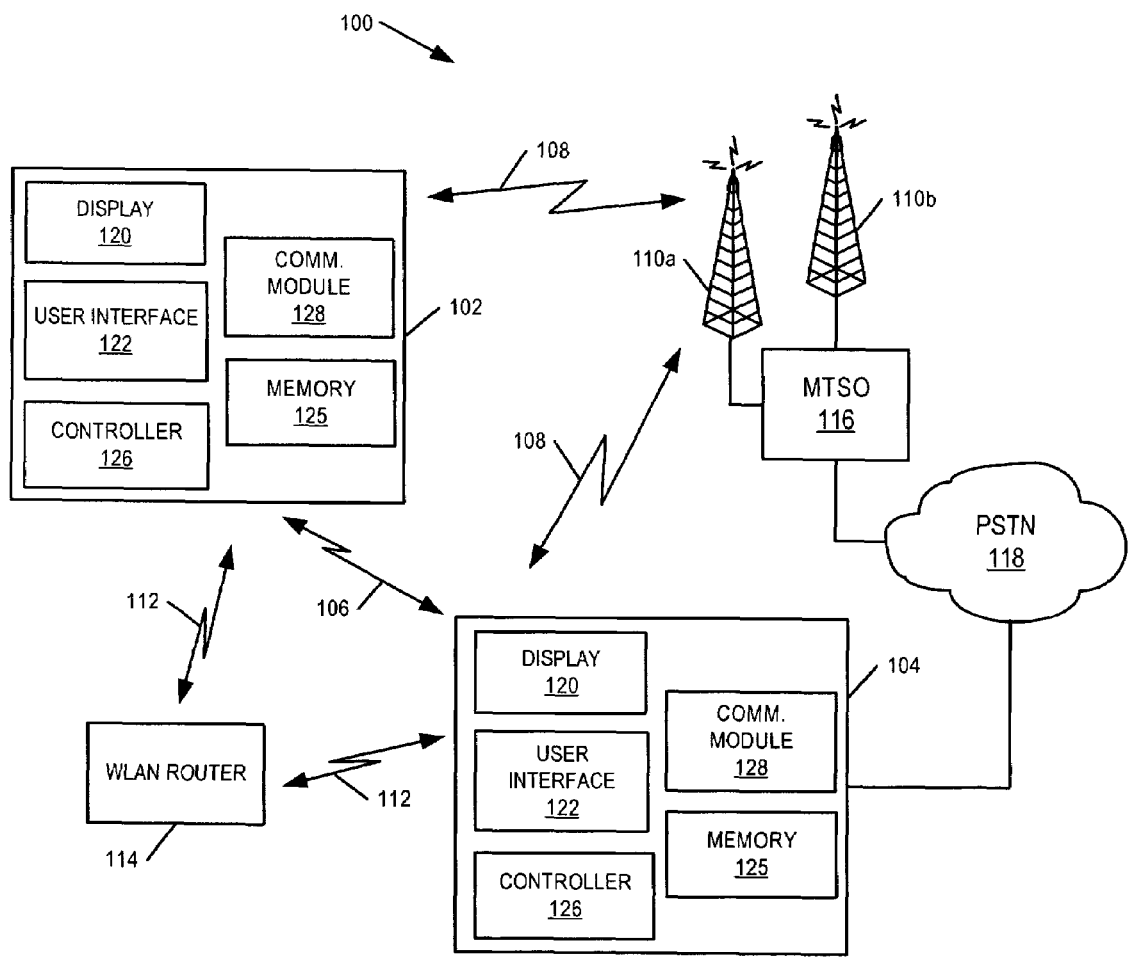
FIG. 1 is a schematic block diagram illustrating wireless communication terminals and a cellular communication system in accordance with some embodiments of the present invention.

DETAILED DESCRIPTION OF EMBODIMENTS
OF THE INVENTION

The present invention now will be described more fully with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods and communication terminals. It is to be understood that each block of the block diagrams and/or operational illustrations, and combinations of blocks in the block diagrams and/or operational illustrations, can be implemented by radio frequency, analog and/or digital hardware, and/or program instructions. These program instructions may be provided to a controller, which may include one or more general purpose processors, special purpose processors, ASICs, and/or other programmable data processing apparatus, such that the instructions, which execute via the controller and/or other programmable data processing apparatus, create means for implementing the functions/acts specified in the block diagrams and/or operational block or blocks. In some embodiments, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "communication terminal" (or simply a "terminal") includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN), and/or another communication terminal. A communication terminal that is configured to communicate over a wireless interface may be referred to as a "wireless communication terminal," a "wireless terminal" and/or a "mobile terminal." Examples of mobile terminals include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

Some embodiments of the invention utilize internet protocols to distribute and/or control the playback of multimedia programs. The Internet protocol multimedia subsystem (IMS) is a standard that has been developed to define the control and integration of multimedia delivery services in a core, packet-switched network. In particular, the IMS architecture defines a set of logical functions that use a signaling protocol known as the session initiation protocol (SIP). SIP is used to establish communication sessions in an IP network. For example, a session may be a one-to-one voice call or a session may be more complex, such as one-to-many conference calls involving multimedia services. SIP may also be used to facilitate voice over IP (VoIP) services, in which voice is transported in IP data packets that may be re-assembled and converted into an audio signal for the recipient. By using VoIP, network operators may use the same IP infrastructure to carry voice traffic that is used to carry data traffic. Thus, IMS may be summarized as a standardized way to connect IP devices and networks using SIP.

Some embodiments of the present invention utilize the ability of an IP terminal or device to provide programs to one or more other IP terminals or devices using, for example, an IMS network. In particular, the SIP protocol may be used to establish peer-to-peer communication sessions between IP terminals/devices to allow an IP terminal/device to provide multimedia programs to one or more other IP terminals/devices. However, it will be appreciated that while the use of SIP protocols is described in connection with some embodiments of the invention, other embodiments of the invention may be implemented without the use of internet protocols.

As used herein, the term "IP terminal or device" refers to a terminal or device that may communicate using the session initiation protocol (SIP). Thus, a "mobile IP terminal" may be a device that includes both characteristics of a "mobile terminal" and an "IP terminal or device." It will be understood that an IP terminal or device may also refer to devices that communicate using SIP via a media gateway, which translates communications, for example, between an IP network and another network, such as the public switched telephone network or a circuit switched wireless network.

As used herein, the term "packet" means a unit of information and/or a block of data that may be transmitted electronically as a whole or via segments from one device to another. Accordingly, as used herein, the term "packet" may encompass such terms of art as "frame" and/or "message," which may also be used to refer to a unit of transmission.

According to some embodiments of the invention, the playback of downloaded multimedia programs may be synchronized between one or more terminals to provide a shared multimedia experience. Moreover, playback of the programs by a group of terminals may be controlled by one or more of the terminals by means of commands communicated using, for example, the SIP protocol. Other protocols, including proprietary or non-standard protocols, may be used to control the playback of the programs. Moreover, client applications could control the playback of the programs using information received using a simple text-based communication protocol such as SMS.

Thus, according to some embodiments of the present invention, a terminal (an "originating terminal" or a "control terminal") may be used to distribute a multimedia program to one or more other subscriber mobile terminals (collectively, the "destination terminals"). For example, an originating terminal may send a multimedia program to a designated group of destination terminals, or cause such a file to be sent from a server (i.e., push-based distribution), or a destination terminal may initiate a download of a multimedia program from the originating terminal and/or from a standalone server (i.e., pull-based distribution). Playback of the multimedia program may be synchronized based on playback commands transmitted from the originating terminal to the destination terminals. Playback commands may include, for example, start, stop, pause, resume, skip, replay, etc. Thus, users of the destination terminals may experience a coordinated playback of the multimedia program. However, it will be appreciated that, in some embodiments, playback of the multimedia program may not be simultaneous at all destination devices because of, for example, device limitations, network latencies, and the like. Moreover, it will be appreciated that playback control could be initiated and/or controlled on a peer-to-peer basis. Thus, any terminal could be considered to be an originating or control terminal with respect to the playback of a given program. Likewise, the originating or control terminal need not send the program directly to the destination terminals, but could instead direct that the program be downloaded from a third party source, for example by providing a hyperlink to the destination terminals.

Communications between the originating terminal and the destination terminals and/or among the destination terminals may be performed during the playback of the multimedia program using, for example, voice over IP (VoIP) communication, SMS communication, cellular communication, instant messaging and/or other means. Thus, users of the destination terminals may communicate with one another during the playback of the multimedia program.

Control signals for controlling the playback of the multimedia program may be issued by the originating terminal, the destination terminals, and/or selected ones of the destination terminals. In some embodiments, only the originating terminal may be permitted to issue playback commands to the destination terminals. However, in some embodiments, a destination terminal may send playback commands to the other destination terminals and/or may send control requests to the originating terminal which contain requests for the originating terminal to control playback of the multimedia program, such as, for example, requests to stop, start and/or resume playback of the multimedia program. In such cases, the originating terminal may accept the request, deny the request and/or queue the request for later processing, depending on the nature, timing, and/or source of the request. In some cases, the originating terminal may be the only device that is aware of the locations and/or network addresses of all of the destination terminals. Thus, in some embodiments, it may be desirable to coordinate control of the playback of the multimedia program through the originating terminal.

FIG. 1 is a schematic block diagram of a wireless communication system 100 that includes two communication terminals 102, 104 that are configured to communicate data with one another over a direct wireless communication interface 106, over another wireless communication interface 108 through one or more cellular base stations 110a-b, and/or over another wireless communication interface 112 through a wireless local area network (WLAN) access point 114. The direct wireless communication interface 106 may include an RF wireless communication interface such as a Bluetooth interface or an infrared communication interface such as for example, the infrared communication interface defined by the Infrared Data Association (IRDA) protocols. The IRDA defines a number of standards for infrared wireless data communication, including standards for infrared wireless communication at data rates up to 16 Mb/s. It will be appreciated that one or more of the communication terminals 102, 104 may be handheld wireless communication terminals such as mobile telephones, PDAs, and the like.

As further illustrated in FIG. 1, the terminals 102, 104 may include a display device 120, a user interface 122, a controller 126, a communication module 128, and a nonvolatile memory 125.

The user interface 122 can include a keypad, keyboard, touchpad, jog dial and/or other user input device. The user interface 122 can also include a microphone coupled to an audio processor that is configured to generate an audio data stream responsive to sound incident on the microphone, a speaker that generates sound responsive to an input audio signal, and/or a camera that captures digital still and/or video images. The communication module 128 is configured to communicate data over one or more of the wireless interfaces 106, 108, and/or 112 to another remote terminal 102, 104. The nonvolatile memory 125 is configured to store digital information even when power to the terminal 102, 104 is switched off.

The communication module 128 can include, for example, a cellular communication module, a Bluetooth module, an infrared communication module, and/or a WLAN module. With a cellular communication module, the terminals 102, 104 can communicate via the base stations 110a-b using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). The cellular base stations 110a-b may be connected to a Mobile Telephone Switching Office (MTSO) 116, which, in turn, may be connected to a PSTN 118 and/or another network. With a Bluetooth or infrared module, the terminal 102, 104 can communicate via an ad-hoc network through the direct interface 106. With a WLAN module, the terminal 102, 104 can communicate through the WLAN router 114 using a communication protocol that may include, but is not limited to, 802.11a, 802.11b, 802.11e, 802.11g, and/or 802.11i. One or more of the terminals 102, 104 may also be configured to communicate directly over the PSTN 118 as shown in FIG. 1.

The terminals 102, 104 may be configured to transmit and/or receive a digital data signal between one another and/or with another communication terminal that may be communicatively coupled thereto through, for example the MTSO 116, the PSTN 118 and/or another network. However, it will be appreciated that data communication between the terminals 102, 104 may be accomplished without using the MTSO 116 or the PSTN 118.

As discussed above, in a traditional podcasting scenario, a multimedia program is downloaded by a user and stored in a terminal. The file may be played back at a later time. In such a system, the recipient may control the time at which the multimedia program is played back. In some cases, this may be highly desirable, as it may provide a degree of flexibility to the user. However, in some cases, it may be desirable for the program provider to control the playback, or at least the initiation of playback, of a multimedia program. For example, where the program includes a time-sensitive announcement, it may be desirable for the program provider to provide the announcement to members of a large audience substantially simultaneously.

Examples of such time-sensitive announcements may include, for example, earnings announcements, restructuring announcements and/or other types of corporate announcements, new movie trailers, concert announcement and other types of advertisements or press releases, etc. In such cases, there may be a conflict between the need to distribute the program widely (e.g. to the largest possible audience) and the need to distribute the program quickly, so that all recipients have the opportunity to view the program at nearly the same time. In traditional multimedia distribution systems, it is not uncommon for servers to crash due to receiving an unmanageable number of requests (or "hits") when a new, highly sought after multimedia program is made available for download. The program provider may not wish to make the file available before the desired release date and time. However, by the same token, the program provider may not be able to manage demand for the file when it is released, when it is delivered using conventional distribution methods.

In other situations, users of the destination terminals may simply wish to share the experience of viewing/listening to the multimedia program. Thus, even though the program provider may be willing to make the multimedia program available at any time, two or more users may wish to share a playback experience of the multimedia program by viewing/listening to it substantially simultaneously.

Figure 2:
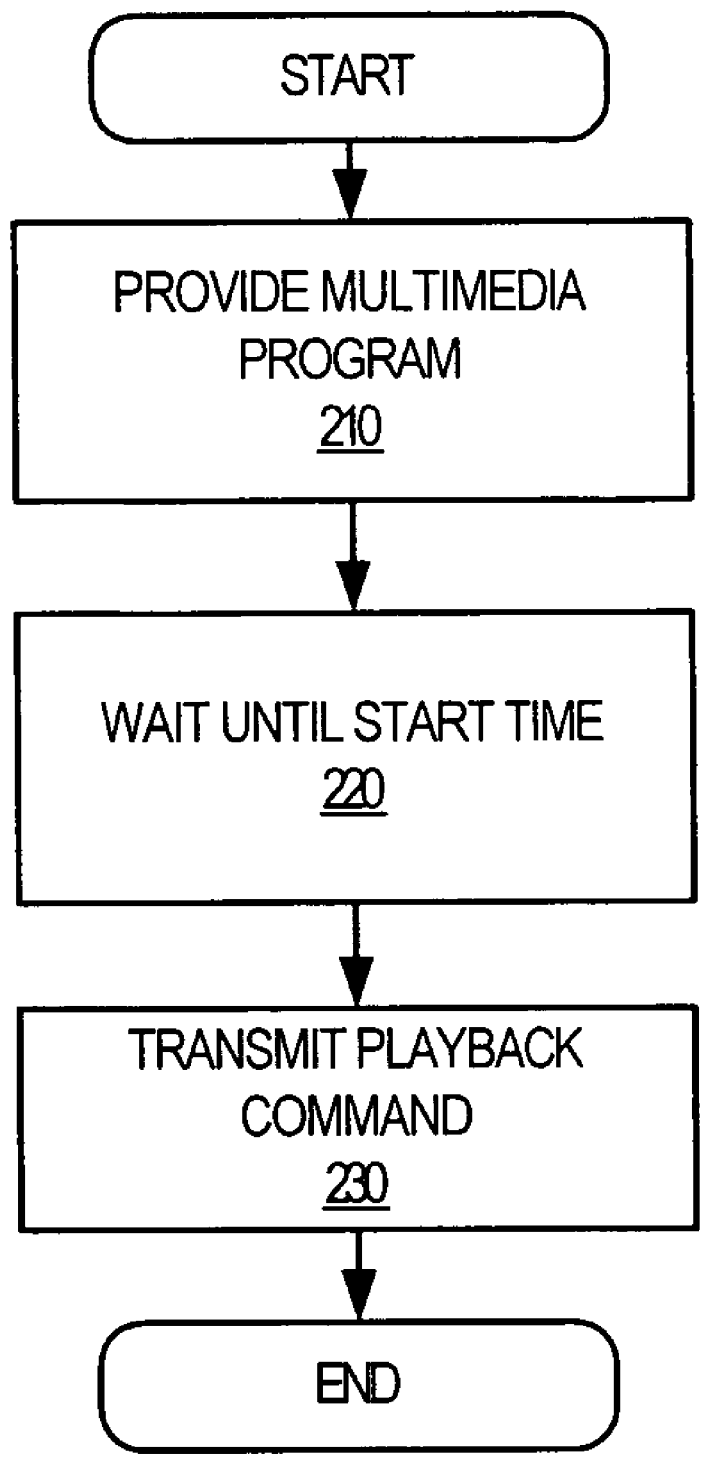
FIGS. 2-6 are flow diagrams illustrating operations for communication terminals according to some embodiments of the invention.

Accordingly, operations 200 of an originating terminal according to embodiments of the invention are illustrated, for example, in the flowchart of FIG. 2. As shown in FIG. 2, a multimedia program is provided to one or more destination terminals (block 210). As discussed above, the originating terminal may transmit the multimedia program to one or more destination terminals using a push-based distribution model in which the originating terminal sends the multimedia program to the destination terminals without first receiving a download request from the destination terminal. In some embodiments, however, the multimedia program may be downloaded to the destination terminals using a pull-based distribution system in which a destination terminal sends a download request to the program provider, which sends the multimedia program to the destination terminal in response to the download request. The multimedia program may be provided to the destination terminals by other means, such as, for example, distribution on a CD-ROM or by other means.

While the terms "push-based" and "pull-based" are used herein to describe various models of distributing programs, it will be appreciated that some embodiments of the present invention may include some aspects of both push-based and/or or pull-based systems. Transmitting of the multimedia program may be accomplished using hypertext transfer protocol (HTTP), file transfer protocol (FTP) protocol, SIP, MMS and/or other protocols.

In some embodiments, the destination terminal may transmit a download request to a first terminal which receives the download request and instructs a server or other terminal on which the multimedia program is located to transmit the multimedia program to the destination terminal. Thus, the multimedia program need not actually be stored at the originating terminal.

In some embodiments of the invention, it will be intended for the multimedia program to be downloaded and played at different times. Accordingly, the multimedia program may be transmitted according to some embodiments of the invention using a network and/or communication path not normally associated with transmission of large multimedia programs. For example, the multimedia program could be transmitted using otherwise unused channel capacity of a cellular telephone network or other connection. In this manner, a large multimedia program may be downloaded less expensively and/or without adversely affecting other network traffic. Likewise, the multimedia program could be transmitted in an IP-based internet communication system during off-peak periods of network communication.

In some embodiments, the multimedia program may be downloaded over a network connection that is different from the network connection that will be used to receive playback commands from the originating terminal. As an example, a multimedia program may be downloaded using an internet connection such as a LAN connection, a WLAN and/or a WAN connection, while the playback of the multimedia program may be controlled via commands received over a cellular telephone network, for example, via SMS and/or MMS messages. Thus, in some embodiments, the multimedia program may be downloaded using a transmission protocol that is different from the transmission protocol that will be used to receive playback commands from the originating terminal. Alternatively, the same network connection and/or the same network protocol may be used both to download the multimedia program as well as to control playback of the file. For example, the IMS system referenced above may be used for distribution of the multimedia program as well as to control playback of the file.

Once the multimedia program has been completely downloaded, the destination terminal may send a notification message to the transmitting terminal to indicate that the multimedia program has been successfully received and is ready to be played. In some embodiments, where the multimedia program has been sent to a plurality of destination terminals, the originating terminal may wait until all and/or a desired number of destination terminals have indicated that they have successfully received the multimedia program before initiating playback of the multimedia program.

Referring still to FIG. 2, in some embodiments, the originating terminal may wait until a designated start time (block 220) and initiate playback of the multimedia program at the destination terminals at the designated start time by transmitting a playback command to the destination terminals (block 230).

The playback of the multimedia program may be controlled, or at least initiated, based on commands (such as play, stop, pause, resume, replay, jump to bookmark, etc.) transmitted by the originating terminal to the destination terminals. However, as the playback control commands issued by the originating terminal may be relatively short compared to the length of a typical multimedia program, relatively little network bandwidth may be required to transmit the playback commands in real time to the destination terminals. This may be contrasted to a typical situation in which a large number of users attempt to download the same multimedia program simultaneously, which may overload the capacity of network servers.

Playback commands may be transmitted to the destination terminals using any of a number communication protocols and/or communication pathways. For example, playback commands may be communicated using SMS and/or MMS messages over a cellular telephone network. Playback commands may also be communicated using IP-based protocols such as IMS and/or SIP or other protocols, including proprietary protocols (i.e. the playback control protocol may, but need not be, a standardized protocol). Thus, some embodiments of the present invention may take advantage of the capability of some wireless IP devices to communicate over various types of networks and/or using various types of communication protocols.

In order to reduce the possibility that a malicious third party could issue spurious playback commands, the playback commands could be encrypted, for example, using public/private key cryptography. For example, the command could be encrypted by the originating terminal using a private key known to the originating terminal. The encrypted command may be decrypted by the destination terminal using a stored copy of the public key of the originating terminal. If the command decrypts properly, it may be assumed that it was actually encrypted by the originating terminal and was not generated by a third party. Each command may also include a unique index number to prevent a malicious party from spuriously re-transmitting a previously transmitted command as a new command.

Figure 3:
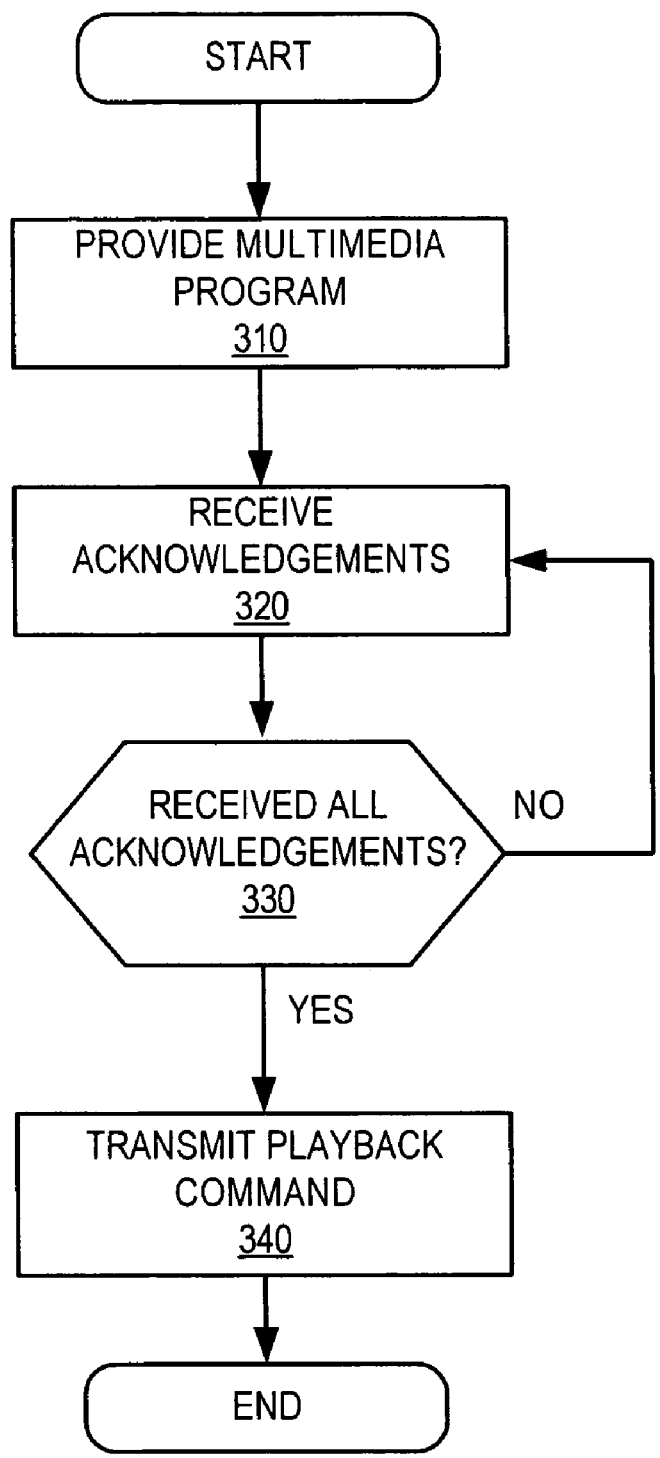

In some embodiments, it may be desirable for the originating terminal to keep track of which destination terminals have received a multimedia program and are ready to play. Thus, in some embodiments, the originating terminal may be aware of the presence of the destination terminals on a network and the presence of the multimedia program at the destination terminals. Presence may be detected using, for example, a presence service as described U.S. patent application Ser. No. 10/921, 440 filed Aug. 19, 2004 and entitled "Methods, Devices, Systems And Computer Program Products For Providing Availability Data Associated With Data Files To Users Of A Presence Service," which is assigned to the assignee of the present invention, the disclosure of which is incorporated herein by reference as if fully set forth. In that way, the originating terminal may wait to transmit a playback command until a group of selected destination terminals are ready to play the multimedia program. For example, referring to the embodiments of FIG. 3, a multimedia program is provided to a destination terminal (block 310). For example, an originating terminal may transmit a multimedia program or make the multimedia program available for downloading either from the originating terminal or from a separate server. A confirmation address may be transmitted along with the multimedia program. The confirmation address, which may include an email address, an SMS address or another type of network address, may be an address to which the destination terminals may send acknowledgment messages as described below. One or more control permissions may also be provided along with the multimedia program indicating what level of control the destination terminal may have over the playback of the multimedia program by the destination terminals. For example, the control permissions may indicate that a destination terminal is or is not allowed to issue playback commands to the other destination terminals, or that the destination terminal is or is not allowed to send playback control requests to the originating terminal during playback of the multimedia program.

As the destination terminals download the multimedia program, they may send acknowledgements back to the originating terminal indicating that the file has been received. The acknowledgements may be sent in a number of ways, for example, by SMS, IMS, and/or email messaging, or otherwise. The originating terminal receives the acknowledgements (block 320) and checks to see if all necessary acknowledgements have been received (block 330). If so, the originating terminal proceeds to transmit a playback command (block 340). If not, the originating terminal may continue to wait for more acknowledgements (block 320).

Figure 4:
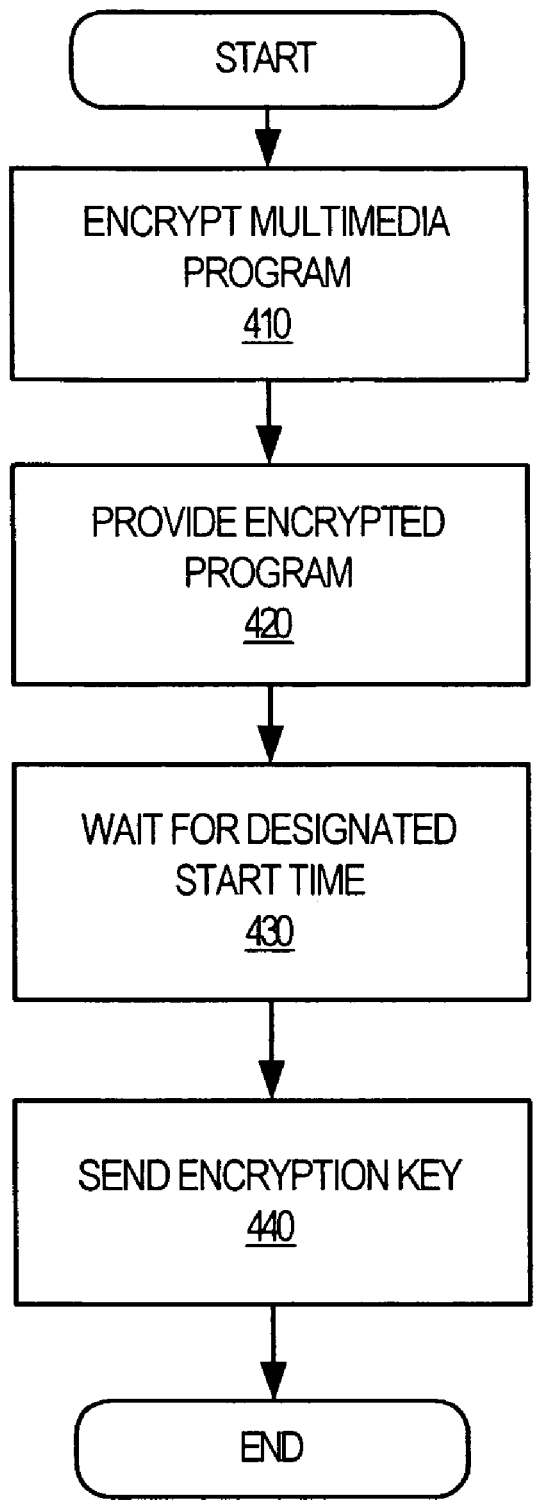

In some cases, it may be desirable to control the playing of the multimedia program by a destination terminal at a designated time. For example, where the multimedia program contains a time-sensitive message such as a corporate announcement, or, for example, where the originator of the message does not want it viewed until it has been downloaded to all of a group of recipients, it may be desirable to control the ability of the destination terminal to play the multimedia program. Accordingly, referring to the embodiments of FIG. 4, in some embodiments of the invention, a multimedia program is encrypted at the originating terminal and/or a standalone server (block 410). In some embodiments, the multimedia program is encrypted using a secret encryption key.

The encrypted multimedia program is then provided to one or more destination terminals, either directly from the originating terminal and/or from a server under the direction of the originating terminal, or by other means (block 420). The originating terminal may then wait until a designated start time (block 430), which may be defined as a particular time and/or a time when all designated destination terminals have acknowledged successful downloading of the multimedia program. At the start time, the originating terminal sends the secret encryption key to the destination terminals (block 440), which terminals may use the encryption key to decrypt the encrypted multimedia program.

In some cases, once the designated start time has passed, the originating terminal may broadcast the encryption key as clear text over a network. As an example, a movie production company may wish to provide a movie trailer for a highly anticipated movie to a large number of potential audience members, but not wish for the trailer to actually be viewed until a designated release date. In accordance with some embodiments of the invention, the production company could encrypt the trailer using a secret encryption key and make the encrypted version of the trailer available for downloading by anyone prior to the release date. At the release date, the production company may transmit the encryption key or otherwise make the encryption key available to the destination terminals, allowing them to decrypt and view the trailer. In such cases, the encryption key could be sent as clear text, as the intent is to allow anyone to subsequently open the file for viewing. A similar model may be employed for the distribution of, for example, time-sensitive corporate announcements.

In other cases, the originating terminal may transmit the encryption key only to selected destination terminals, for example, destination terminals associated with users that have paid a subscription fee to receive the key. In such cases, it may be desirable to send the encryption key in an encrypted form.

Figure 5:
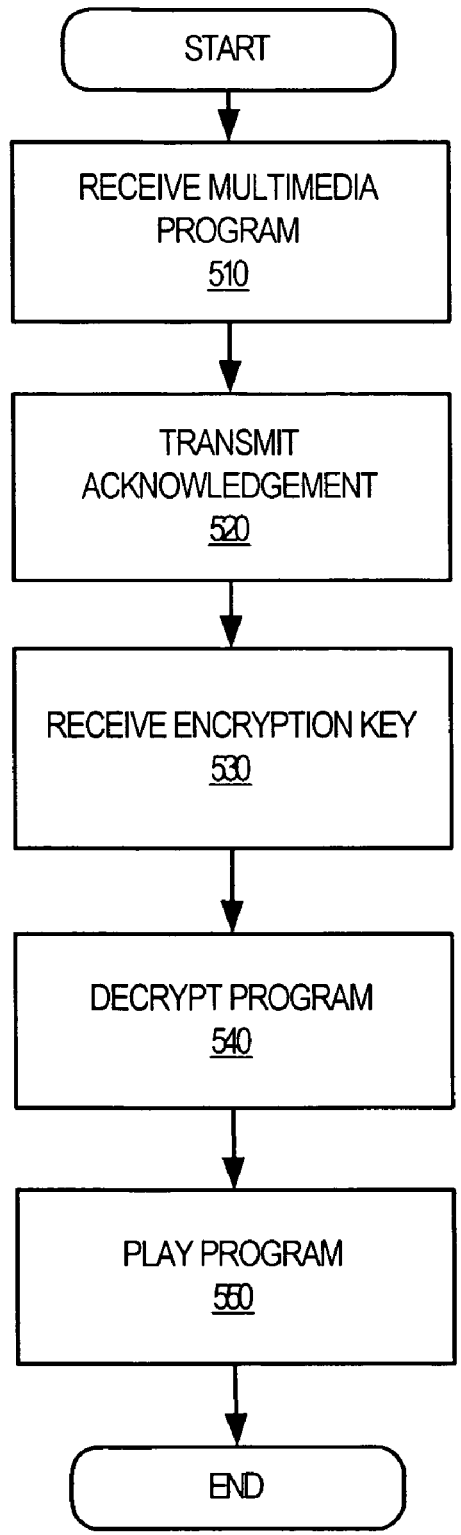

Operations of a destination terminal according to some embodiments of the invention are illustrated in FIG. 5. As shown therein, a destination terminal may receive a multimedia program (block 510) and transmit an acknowledgement once the multimedia program has been received and is available for playing at the destination terminal (block 520).

The destination terminal then optionally receives the encryption key (block 530) and uses it to decrypt the file (block 540). The destination terminal may then play the program (block 550), either under its own control or under the control of playback commands issued, for example, by the originating terminal.

Figure 6:
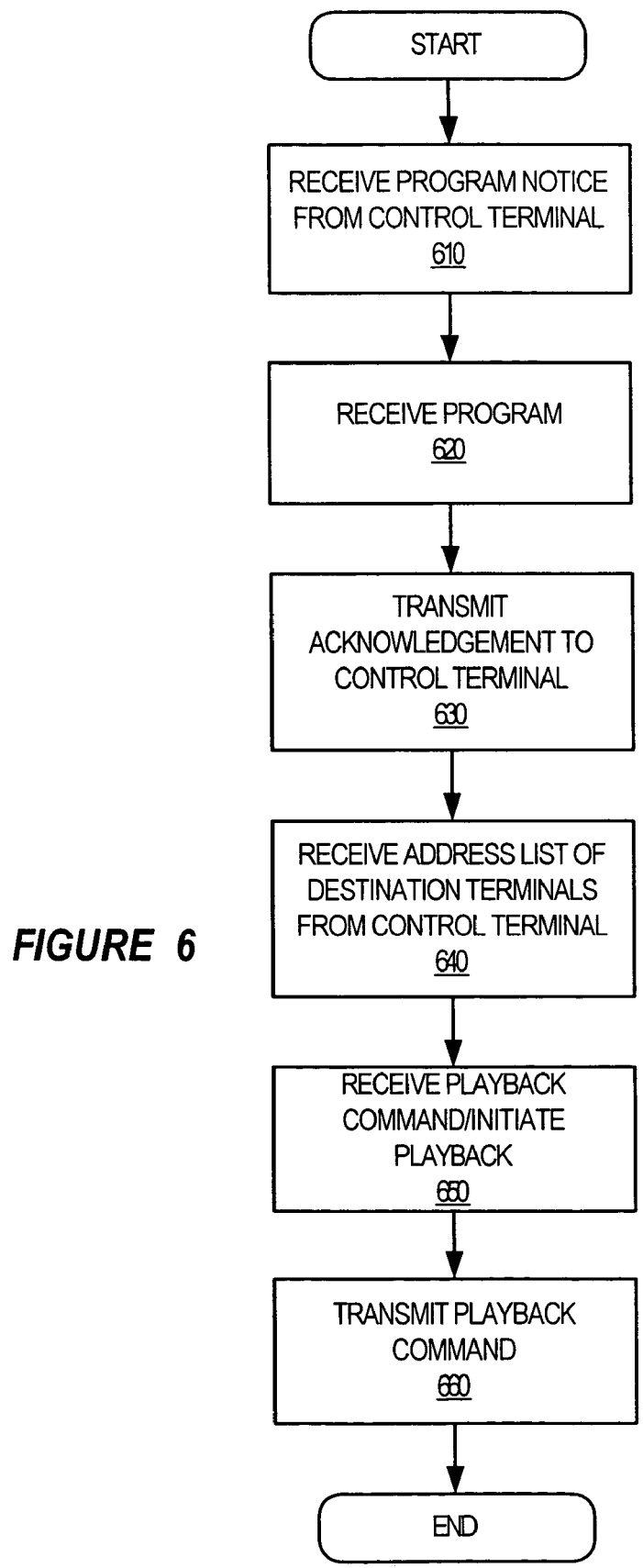

Operations of a destination terminal according to some embodiments of the invention are illustrated in FIG. 6. As shown therein, a destination terminal may receive a notice from a control terminal that a program is available (block 610). The notice may include, for example, a hyperlink to a location from which the program may be downloaded. The destination terminal may retrieve the program, for example by downloading it from the control terminal and/or from a designated download location (block 620). Once the program has been successfully downloaded, the destination terminal may optionally transmit an acknowledgement to the control terminal indicating that the program has been received at the destination terminal (block 630). The control terminal may optionally send a list of addresses/identities of other destination terminals to permit the destination terminal to issue playback commands to the other destination terminals (block 640). Alternatively, the control terminal may send a designated address to which the destination terminal may send playback control commands, which may then be relayed to the other destination terminals. The control terminal may also send, along with the address and/or list of addresses, an indication of the types of control commands that may be issued by the destination terminal during playback of the program.

The destination terminal may then receive a playback command from the control terminal or from another destination terminal and responsively initiate playback of the program (block 650). During playback, depending on the level of playback control the destination terminal is authorized, the destination terminal may transmit a playback command (block 660). The playback command may transmitted directly to other destination terminals or to the control terminal or a designee that may forward the playback command to other destination terminals. Multiple playback commands may be transmitted/received during playback of a program.

In some cases, the originating terminal and/or a destination terminal may issue a playback command during playback of the multimedia program. The destination terminal receiving the playback command may process the playback command. Likewise, the originating terminal and/or a destination terminal may initiate a voice transmission during playback of the multimedia file. In such cases, the destination terminal may interrupt playback of the multimedia file and process the voice transmission. After the voice transmission has been processed, playback of the multimedia program may resume automatically or based on a command issued by the originating terminal and/or a destination terminal. In some embodiments, the voice transmission may be played concurrently with the playback of the multimedia program. That is, the voice signal may be played over the multimedia program so that the playback of the multimedia program is not stopped.

The present invention has been described in part with reference to FIGS. 2-6, which are flowchart illustrations illustrating exemplary operations for playing a downloaded multimedia program according to some embodiments of the present invention. It will be understood that blocks of the flowchart illustrations of FIGS. 2-6, and combinations of blocks in the flowchart illustrations, may be implemented using electronic circuits included in communication terminals, such as the mobile terminals 102, 104. It will also be appreciated that blocks of the flowchart illustrations of FIGS. 2-6, and combinations of blocks in the flowchart illustrations, may be implemented using components other than those illustrated in FIG. 1, and that, in general, the blocks of the flowchart illustrations of FIGS. 2-6 and combinations of blocks in the flowchart illustrations, may be implemented in special purpose hardware such as discrete analog and/or digital circuitry, such as combinations of integrated circuits or one or more application specific integrated circuits (ASICs), as well as by computer program instructions, which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 2-6 support electronic circuits and other means for performing the specified functions/acts, as well as combinations of steps for performing the specified functions/acts. It will be understood that the circuits and other means supported by each block of the flowchart illustrations of FIGS. 2-6, and combinations of blocks therein, can be implemented by special purpose hardware, software or firmware operating on special or general purpose data processors, or combinations thereof.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of synchronizing playback of a multimedia program by a plurality of subscriber mobile terminals, comprising:

providing a multimedia program to the plurality of subscriber mobile terminals; and providing a playback command to the plurality of subscriber mobile terminals, after providing the multimedia program, to control the playback of the provided multimedia program by the plurality of subscriber mobile terminals;

receiving a second playback command by the plurality of subscriber mobile terminals during playback of the multimedia program; and controlling the playback of the multimedia program by the plurality of subscriber mobile terminals responsive to the second playback command.

2. The method of claim 1, further comprising:

receiving the multimedia program at at least one of the plurality of subscriber mobile terminals;

receiving the playback command at the at least one of the plurality of subscriber mobile terminals; and initiating playback of the multimedia program at the at least one of the plurality of subscriber mobile terminals.

3. The method of claim 2, wherein receiving the playback command comprises receiving the playback command via an IMS and/or SMS messaging service.

4. The method of claim 2, further comprising:
receiving a voice signal during playback of the multimedia program; and
playing the voice signal concurrently with playback of the multimedia program.

5. The method of claim 4, wherein the voice signal is received via a protocol comprising MMS and/or VoIP.

6. The method of claim 2, further comprising:
receiving a voice signal during playback of the multimedia program;
interrupting the playback of the multimedia program responsive to receiving the voice signal; and
playing the voice signal while the playback of the multimedia program is interrupted.

7. The method of claim 2, further comprising:
transmitting a playback command from one of the plurality of subscriber mobile terminals to other of the subscriber mobile terminals during playback of the multimedia program by the other subscriber mobile terminals.

8. The method of claim 2, further comprising:
transmitting a playback command request from one of the subscriber mobile terminals to a control terminal; and
transmitting a playback command from the control terminal to selected ones of the plurality of subscriber mobile terminals responsive to the playback command request.

9. The method of claim 1, wherein the playback command is encrypted.

10. The method of claim 2, further comprising:
transmitting configuration data to one of the subscriber wireless terminals, the configuration data including control permissions for the one of the subscriber wireless terminals.

11. The method of claim 10, wherein the control permissions specify the permissions of the one of the subscriber wireless terminals to control playback of the multimedia program by the one of the plurality of subscriber wireless terminals.

12. The method of claim 1, wherein providing the multimedia program to the plurality of subscriber mobile terminals comprises transmitting the multimedia program over a first network, and providing the command to the plurality of subscriber mobile terminals comprises transmitting the command over a second network, different from the first network.

13. The method of claim 12, wherein the first network comprises the internet and the second network comprises a cellular communication network.

14. The method of claim 1, further comprising:
transmitting the multimedia program to a plurality of subscriber mobile terminals;
receiving the multimedia program at one of the plurality of subscriber mobile terminals; and
transmitting a notification from the one of the plurality of subscriber mobile terminals in response to receiving the multimedia program.

15. The method of claim 14, wherein transmitting the multimedia program to the plurality of subscriber mobile terminals comprises transmitting a confirmation address together with the multimedia program, and wherein transmitting a notification from the one of the subscriber mobile terminals in response to receiving the multimedia program comprises transmitting the notification addressed to the confirmation address.

16. The method of claim 1, wherein the multimedia program comprises an encrypted data file, and wherein transmitting the command to the plurality of subscriber mobile terminals comprises transmitting a file decryption key configured to decrypt the encrypted data file to the plurality of subscriber mobile terminals.

17. The method of claim 16, further comprising:
receiving the command including the file decryption key at the one of the subscriber mobile terminals;
decrypting the encrypted data file; and
initiating playback of the multimedia program.

18. The method of claim 1, wherein providing the multimedia program to the plurality of subscriber mobile terminals comprises transmitting the multimedia program using a first transmission protocol; and
wherein transmitting the command to the plurality of subscriber mobile terminals comprises transmitting the command using a second transmission protocol, different from the first transmission protocol.

19. The method of claim 18, wherein the first transmission protocol comprises HTTP, FTP, SIP, and/or MMS, and wherein the second transmission protocol comprises SMS and/or SMTP.

20. A communication system comprising:
a plurality of subscriber mobile terminals configured to play a multimedia program; and
an originating terminal configured to provide the multimedia program to the plurality of subscriber mobile terminals and to provide a first playback command to the plurality of subscriber mobile terminals, after providing the multimedia program, to control the playback of the provided multimedia program by the plurality of subscriber mobile terminals, thereby coordinating playback of the multimedia program by the plurality of subscriber mobile terminals;
wherein at least one of the plurality of subscriber mobile terminals is configured to transmit a second playback command to others of the plurality of subscriber mobile terminals during playback of the multimedia program by the others of the plurality of subscriber mobile terminals.

21. The communication system of claim 20, wherein at least one of the plurality of subscriber mobile terminals is configured to receive the multimedia program, to receive the first playback command from the originating terminal, and to control playback of the multimedia program responsive to the playback command received from the originating terminal.

22. The method of claim 21, wherein at least one of the plurality of subscriber mobile terminals is configured to transmit a playback command request to the originating terminal; and
wherein the originating terminal is further configured to transmit the first playback command to selected ones of the plurality of subscriber mobile terminals responsive to the playback command request.

23. A computer readable storage medium having computer readable program code embodied in said medium for coordinating playback of a multimedia program provided to a plurality of subscriber mobile terminals and executed by a processor, the computer readable storage medium comprising:
computer readable program code configured to receive the multimedia program at one of the plurality of subscriber mobile terminals;
computer readable program code configured to receive a first playback command at the one of the subscriber mobile terminals; and
computer readable program code configured to control playback of the multimedia program at the one of the plurality of subscriber mobile terminals in response to the first playback command; and computer readable program code configured to transmit a second playback command to other of the plurality of subscriber mobile terminals during playback of the multimedia program by the other of the plurality of subscriber mobile terminals.

24. The computer readable storage medium of claim 23, further comprising:

computer readable program code configured to receive a voice signal during playback of the multimedia program; and computer readable program code configured to play the voice signal concurrently with playback of the multimedia program.

25. The computer readable storage medium of claim 23, further comprising:

computer readable program code configured to receive a voice signal during playback of the multimedia program;

computer readable program code configured to interrupt the playback of the multimedia program responsive to receiving the voice signal; and computer readable program code configured to play the voice signal while the playback of the multimedia program is interrupted.

26. A mobile communication terminal comprising:
a processor; and
a display coupled to the processor and configured to play a multimedia program;
wherein the processor is configured to receive the multimedia program from a remote terminal, to receive a playback command, and to initiate playback of the multimedia program in response to the playback command, and wherein the processor is further configured to receive a second playback command during playback of the multimedia program and to control the playback of the multimedia program responsive to the second playback command;
wherein the processor is further configured to transmit the second playback command to other mobile communication terminals during playback of the multimedia program by the other mobile communication terminals.

27. The mobile communication terminal of claim 26, wherein the processor is further configured to receive a voice signal during playback of the multimedia program and to play the voice signal concurrently with playback of the multimedia program.

28. The mobile communication terminal of claim 26, wherein the processor is further configured to receive a voice signal during playback of the multimedia program and to interrupt the playback of the multimedia program responsive to receiving the voice signal, and wherein the processor is further configured to play the voice signal while the playback of the multimedia program is interrupted.

* * * * *